United States Patent [19]

Sheldon et al.

[11] Patent Number: 4,988,244
[45] Date of Patent: Jan. 29, 1991

[54] SIX-AXIS MACHINE TOOL

[75] Inventors: Paul C. Sheldon, Mequon; Edward E. Kirkham, Brookfield, both of Wis.

[73] Assignee: Kearney & Trecker, Milwaukee, Wis.

[21] Appl. No.: 572,167

[22] Filed: Aug. 23, 1990

Related U.S. Application Data

[62] Division of Ser. No. 7,401,909, Sep. 1, 1989, abandoned.

[51] Int. Cl.$^5$ .............................. B23C 1/06; B25J 11/00
[52] U.S. Cl. ..................................... 409/132; 248/631;
248/654; 408/234; 409/145; 409/201; 409/216;
409/235; 901/22; 901/23
[58] Field of Search ................. 409/80, 131, 132, 145,
409/164, 183, 201, 204, 211, 212, 216, 235;
408/129, 130, 234, 236; 901/22, 28, 29, 23, 21;
434/29, 58; 248/371, 398, 631, 652, 653, 654;
414/735; 74/479; 29/39, 36, 50

[56] References Cited

U.S. PATENT DOCUMENTS

| | | | |
|---|---|---|---|
| 4,651,589 | 3/1987 | Lambert | 901/28 X |
| 4,806,068 | 2/1989 | Kohli et al. | 901/22 X |
| 4,819,496 | 4/1989 | Shelef | 74/479 |

FOREIGN PATENT DOCUMENTS

| | | | |
|---|---|---|---|
| 1049244 | 10/1983 | U.S.S.R. | 901/23 |
| 1194672 | 11/1985 | U.S.S.R. | 901/22 |
| 1222538 | 4/1986 | U.S.S.R. | 901/22 |
| 1296401 | 3/1987 | U.S.S.R. | 901/22 |
| 2083795 | 3/1982 | United Kingdom | 901/22 |
| 2179605 | 3/1987 | United Kingdom | 409/235 |

*Primary Examiner*—William Briggs

[57] ABSTRACT

A machine includes a pair of spaced supports, one of which may mount an operator such as a tool in a spindle and the other of which may mount an object such as a workpiece. The spaced platforms are joined by six powered and extensible legs joined to the respective platforms by universal joints. The length of the legs is individually manipulated to vary the position of the platforms and therefore the object and operator relative to each other in six axes. The powered legs may be hydraulic cylinders or recirculating ball screw driven. The distance between the spaced platforms may be measured by separate instrument arms which join the platforms. The instrument arms may use a digital position device to measure the extension and contraction of the instrument arms or may use a laser interferometer for that purpose. The changes in the instrument arm's lengths may be used to generate signals which are used to control the extension and contraction of the powered legs. A method for converting the part program coordinate block instructions into instructions for varying the length of the powered legs.

5 Claims, 6 Drawing Sheets

SIX-AXIS MACHINE TOOL

This is a divisional application of U.S. patent application Ser. No. 07/401,909, filed Sept. 1, 1989 now abandoned.

BACKGROUND OF THE INVENTION

This invention relates to a machine for locating an operator with respect to an object, and more particularly to a versatile machine tool in which the tool can be moved in three lineal directions and three rotational directions in relation to the surface of a workpiece.

The most versatile form of cutting tool type machine tool presently in use is the so-called machining center which typically can accomplish milling, drilling, boring and tapping operations in up to five axes of movement, the three linear orthogonal axes and two rotational directions. Since its introduction over thirty years ago, the machining center's basic components have not changed. They typically include a bed, an upright column and a spindle head carried by the column. A rotary table for holding a workpiece is typically mounted on the bed and provides one of the rotary directions of motion. The column and table move relative to each other for one of the linear directions of motion, the spindle head and table move relative to each other in a vertical direction for a second linear axis of motion, and the spindle head and workpiece move horizontally with respect to each other for the third linear direction of motion. The fifth axis is provided by rotating the spindle head or the work table in a vertical plane relative to each other.

A sixth axis of rotary motion is available in the present machining centers by controlling the angular position of the spindle. The present machining centers may have either a horizontal spindle or a vertical spindle and they typically are controlled by computer numerical control. The machining centers usually have mechanisms for automatically changing tools from and to a magazine of tools associated with the machining center, and will often have automatic workpiece handling as well.

To achieve the full six axes of motions in a present machining center requires that the movements of the table, column, spindle head, spindle, and bed be coordinated and that these sometimes massive components be moved in very controllable finite increments. Because all of these components are being moved, many times simultaneously under computer numerical control, accuracy requires a rigidity to the components and an accurate path through which the components can be moved. This has resulted in the development of more rigid and massive components such as for the bed and column and very expensive and finely formed ways along which the components can travel relative to each other in the linear directions.

Although the modern machining center provides very accurate machining, it becomes very complex and expensive when it is designed to provide the maximum versatility of being able to machine any point on the exposed five surfaces of the typical cubic workpiece.

SUMMARY OF THE INVENTION

Instead of being constrained by the typical construction of machine tools as exemplified by the modern machining center, our invention focuses on the ultimate task of bringing a tool to bear against a workpiece. To accomplish this task with the greatest degree of flexibility, our invention has the effect of suspending the spindle in air relative to the workpiece on a plurality of leg-like members that are connected between a support for the workpiece and a support for the spindle. The leg members can be manipulated by a plurality of actuators to position the spindle. The tool being held by the spindle can thereby be brought to bear against any exposed surface of the workpiece because the spindle can be moved through space in three orthogonal linear directions and in three rotational directions about each of the linear axes.

Although our invention finds particular use in machine tools, it is useful for locating other types of operators relative to an object and can be used with multiple forms of tools other than the typical rotary cutting tools.

In summary, in the broadest sense our invention relates to a machine for locating an operator relative to an object which comprises supports for the operator and object that are spaced from each other, six leg members with each leg member being joined at spaced points along the leg member to the two supports, the areas circumscribed by the junctions of the leg members in the two supports being substantially the same, together with means for individually manipulating at least certain of the leg members to vary the position of the points of such leg members relative to each other, and to thereby alter the position of the operator with respect to the object.

Also in the broadest sense, our invention relates to a machine tool for locating a tool relative to a workpiece in which the tool is located relative to a first support, the workpiece is located relative to a second support, the two supports are connected by six legs with means for manipulating the legs to vary the lengths of the legs.

Preferably, the machine also includes means for sensing the changes in position of the points of the leg members, and control means including responsive to the sensing means, for coordinating the manipulating means.

In the preferred embodiments, the junctions of the six legs to the two supports generally define edges of a regular octahedron or the junctions of the leg members to the supports define the corners of a six-sided polyhedron in each support.

In the preferred embodiments, the leg members are six linearly extensible legs and the manipulating means includes an actuator for each leg for individually extending and contracting the length of the leg. The six leg members are arranged in pairs and the leg members of each pair are at an angle relative to each other. The sensing means may be formed as part of a plurality of instrument arms. The instrument arms are joined between the supports in a known relationship to the leg member so that a change in position of the points on the leg members is translated into a changes in length of the instrument arm.

In other preferred embodiments, the leg members are three linearly extensible legs and the manipulating means includes two actuators for each leg, one actuator for extending and contracting the leg and the other for varying the angular position of the leg with respect to the supports.

Our invention also comprises a method of locating an operator, such as a tool, relative to an object, such as a workpiece by locating the operator relative to a first support and locating the object relative to a second support, connecting the supports together by six extensible legs, and manipulating the length of the legs to provide up to three linear degrees of motion and three rotational degrees of motion, or any combination thereof, to the tool relative to the workpiece.

The tool or other operator may be a rotating cutting tool, a wire saw, a nozzle for an oxyacetylene or plasma torch, a laser beam, an electric discharge wire, a probe or other measuring device, a drafting pen, sewing or knitting needles, grips, and so forth without limitation. The tool or other operator may be held stationary while the workpiece or other object is moved, or vice versa.

It is a principal object of this invention to provide a machine for bringing an operator, such as a tool, into contact with an object, such as a workpiece, with the maximum degree of freedom of motion of the operator with respect to the object.

It is a further object of this invention to provide a novel machine tool structure for supporting a tool relative to a workpiece while providing six degrees of freedom of motion of the tool with respect to the workpiece.

It is another object of the invention to provide a machine tool having six degrees of freedom of motion with each degree of motion under active control.

It is also an object of the invention to provide a machine for bringing an operator into contact with an object in which the position of the operator relative to the object is sensed independently of the mechanisms for moving the operator relative to the object.

It is another object of the invention to provide a machine which is structurally stiff and operationally stable while providing maximum degrees of motion of an operator relative to an object.

The foregoing and other objects and advantages of the invention will appear in the detailed description that follows. In the description, reference is made to the drawings which illustrate several preferred embodiments of the invention.

DETAILED DESCRIPTION OF THE PREFERRED EMBODIMENTS

Figure 2:
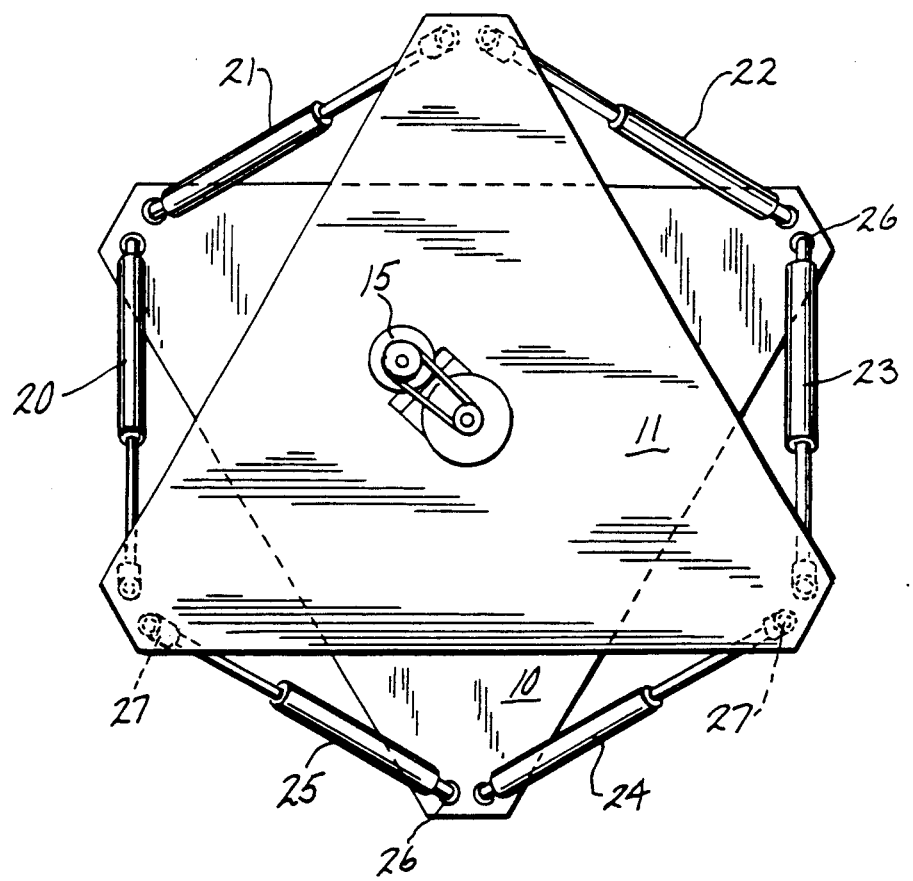
FIG. 2 is a top plan view of the machine tool of FIG. 1.
Figure 1:
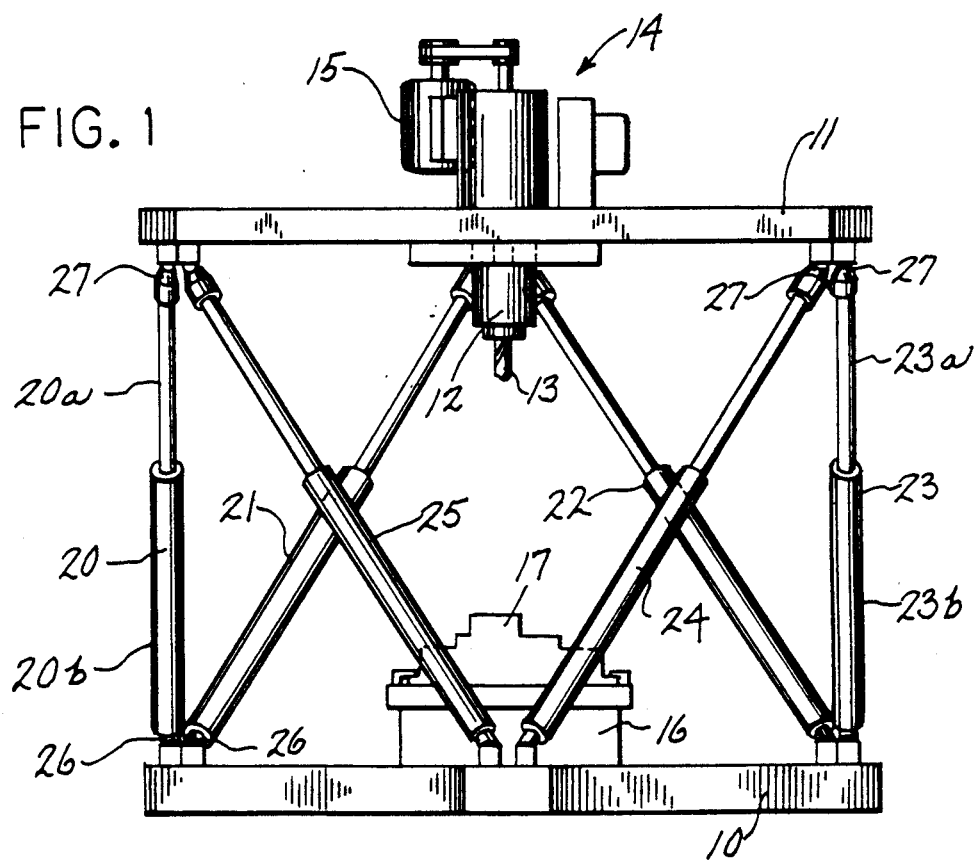
FIG. 1 is a view in elevation of a machine tool in accordance with the invention.

Referring to FIGS. 1 and 2, the machine tool of the first embodiment has a base 10 in the nature of a support or platform and a spindle support or platform 11 spaced from the base 10. A spindle head 12 is mounted on the spindle platform 11 and is adapted to receive a rotating cutting tool 13. A spindle drive assembly indicated generally by the numeral 14 is mounted on the spindle platform 11 and the drive includes a motor 15 connected by a power train to the spindle head 12 in a usual manner. The base platform 10 carries a workpiece support 16 which in turn receives a workpiece represented by the part 17.

The spaced platforms 10 and 11 are joined together by six powered and extensible legs 20–25. Each of the legs is pivotally mounted at its lower extremity to the base platform 10 by a ball and socket joint 26. Similarly, each of the upper ends of the legs 20–25 is pivotally attached to the spindle platform 11 by a second ball and socket joint 27.

The legs 20–25 may be formed of telescoping upper and lower parts 20a and 20b, for example. The telescoping parts may be the piston rod 20a and cylinder 20b of a hydraulic cylinder. The length of such legs can be adjusted by increasing or decreasing the volume of hydraulic fluid in each cylinder.

The position of the spindle support 11 relative to the base support 10 and therefore the position of the cutting tool 13 relative to the workpiece 17 can be adjusted by simultaneously manipulating the length of each of the six legs 20–25. Within an envelope of motion the cutting tool 13 can be applied against all five exposed surfaces of a cubic type workpiece. The only constraints to the envelope of motion relative to the five exposed surfaces are the spread of the joints 26 on the base support 10 and the spread of the second joints 27 on the spindle support 11, the minimum and maximum length of the legs 20–25, the total range of linear motion of each of the legs, and the need to avoid placing certain legs in a common plane for purposes of stability. Within the envelope of motion, this construction allows the machining of contours in three dimensions as well as straight line point-to-point machining.

The simultaneous manipulation of the length of each of the legs 20–25 can achieve motion in all six axes. That is, motion in a linear direction along each of the three orthogonal axes and rotary motion about each of those three axes.

In the embodiment of FIGS. 1 and 2, the six legs may be considered to be arranged in three pairs. That is, the legs 20 and 21 constitute a pair, the legs 22 and 23 constitute a second pair, and the legs 24 and 25 constitute a third pair. It should be noted that the legs of each pair are arranged so that they are at an angle with respect to each other. The joints 26 of the pair of legs 20 and 21 are close to each other. The joints 27 of adjacent legs 20 and 25, for example, are also close to each other. The effect is that the lower joints 26 generally define a triangle and the upper joints 27 also generally define a triangle. These two triangles and the six legs generally define edges of an octahedron. As shown in FIGS. 1 and 2, the area of the base platform 10 circumscribed by the lower ball joints 26 and the arc of the spindle support 11 circumscribed by the upper ball joints 27 are substantially the same. This is advantageous for several reasons. First, such as arrangement maximizes the structural stiffness of the machine. Secondly, the footprint of the machine is minimized for a particular cubic size of workpiece to be handled. Also, a greater envelope of surface area for the workpiece can be accommodated before certain legs and supports are positioned in a common plane thereby creating a potentially ambiguous position.

Figure 3:
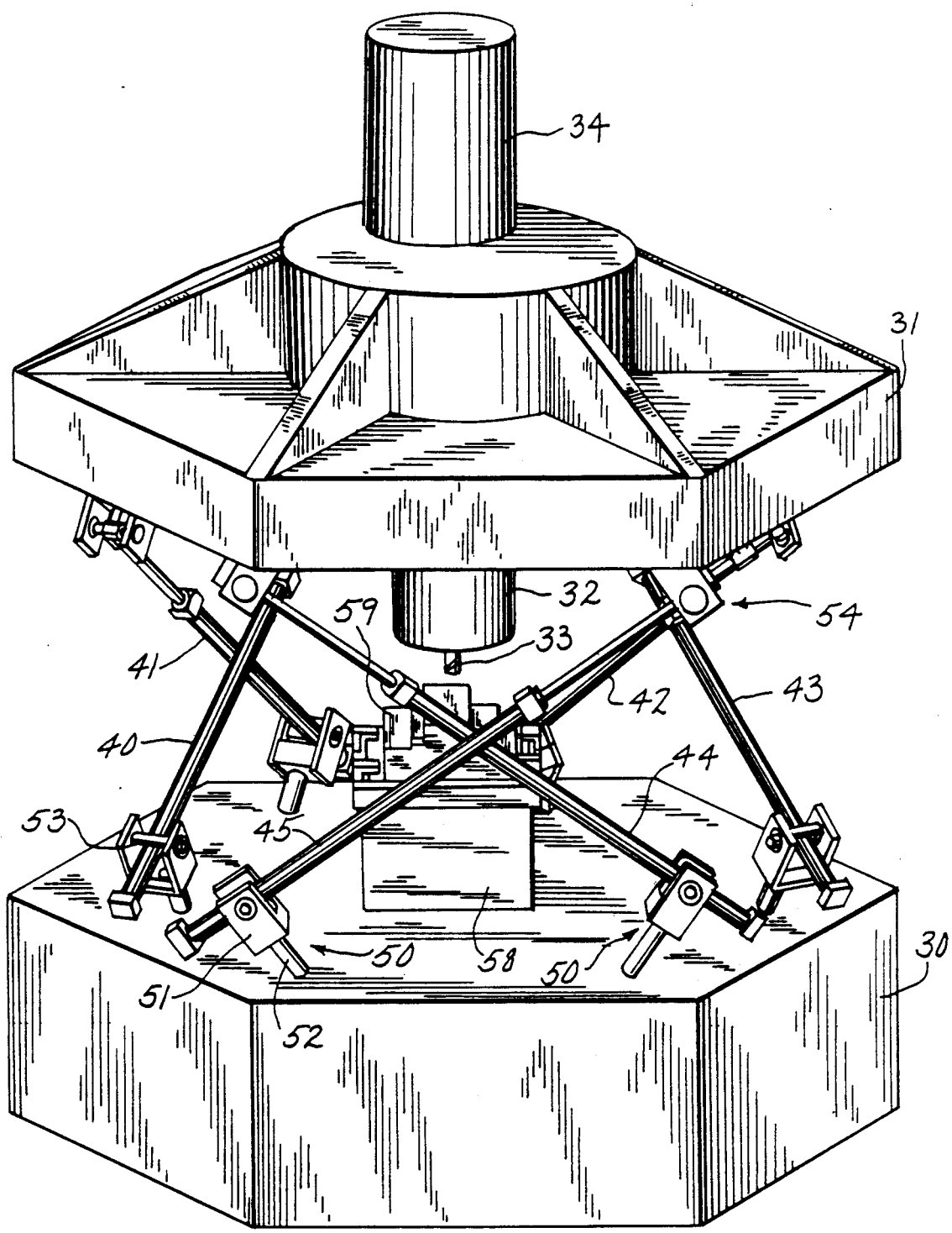
FIG. 3 is a view in perspective of a second embodiment of a machine tool in accordance with the present invention.
Figure 4:
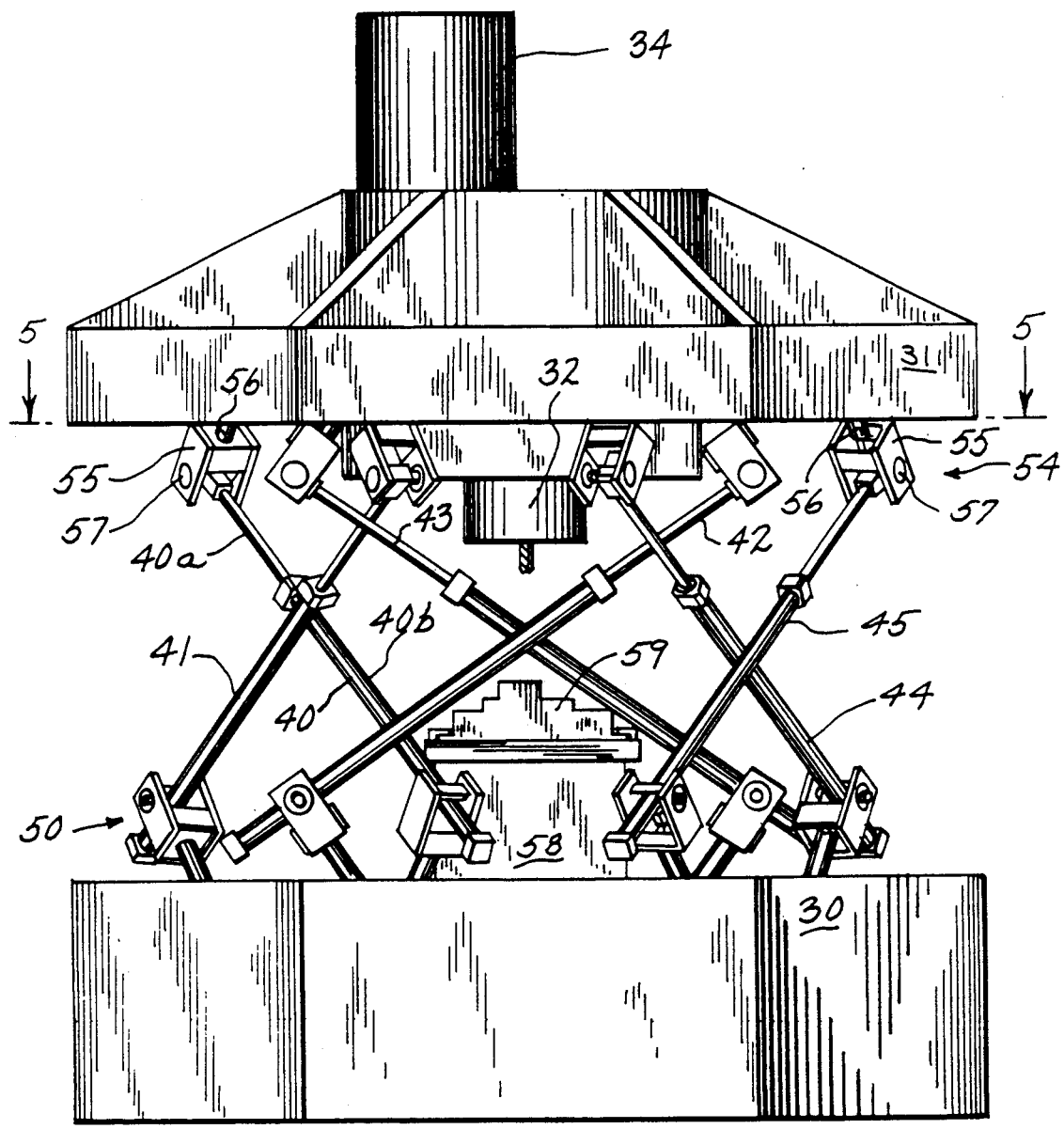
FIG. 4 is a view in elevation of the machine tool of FIG. 3.
Figure 5:
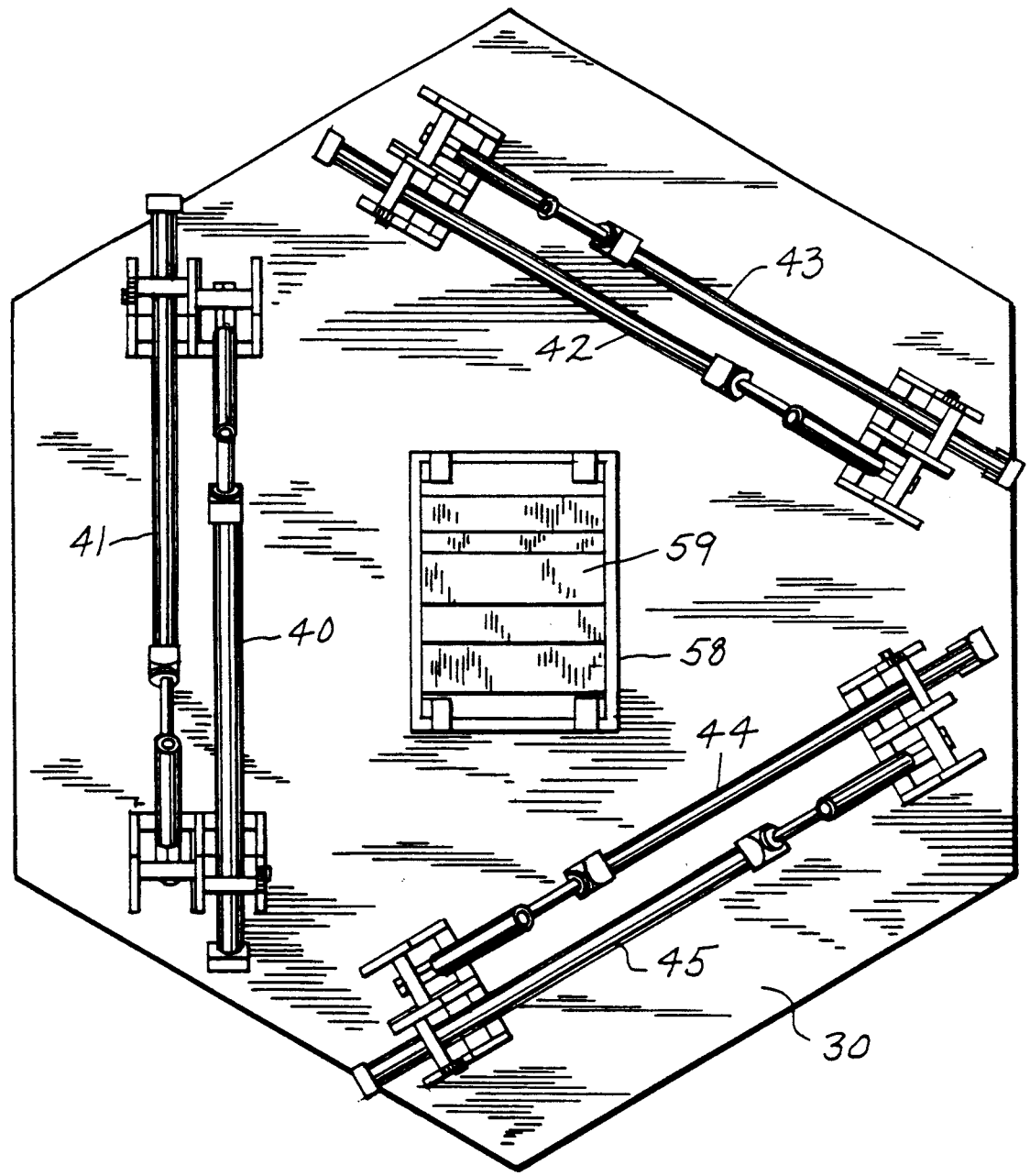
FIG. 5 is a top view of the machine tool of FIGS. 3 and 4 as viewed through the section of the plane 5—5 of FIG. 4.

Referring to FIGS. 3-5, the second embodiment includes a base support or platform 30, a spindle support 31 which mounts a spindle 32 adapted to receive a cutting tool 33. The spindle head is rotated by a spindle drive 34. The base support 30 and spindle support 31 are connected by six extensible legs 40-45. The legs are arranged in three pairs such as the pair 40 and 41 and legs of each pair cross each other so that they are again mounted at an angle with respect to each other. The legs 40-45 are also formed of telescoping upper and lower elements 40a and 40b, for example.

The legs 40-45 are joined to the base support 30 at a first point near their lower end by a joint indicated generally by the numeral 50. The joint 50 includes a clevis 51 mounted for rotation about the axis of a shaft 52 that projects from the base support 30. A typical trunnion 53 engages the lower element 40b-45b of each leg and is rotatably mounted in a clevis 51. It will thus be seen that a joint 50 provides two degrees of freedom of movement.

The upper telescoping portions 40a-45a of the legs are similarly joined to the spindle support 31 at second points along the length of the legs by joints 54. The joints 54 likewise consist of a clevis 55 rotatably mounted on a shaft 56 extending downwardly from the underside of the spindle support 31 and a trunnion 57 which supports the upper leg portions 40a et seq. in the clevis 55. As can be seen in FIG. 5 in particular, the joints 50 and 54 and their attachments to the supports 30 and 31 define the corners of a six-sided polygon in each of the two supports. As is apparent from FIGS. 3-5, the area of the base support 30 that is circumscribed by the connections of six lower joints 50 with the base support 30 is substantially the same as the area of the spindle support 31 that is circumscribed by the connections of the six upper joints 54 with the spindle support 31.

The shafts 52 and 56 of the joints 50 and 54 can be mounted in their respective supports to project in any direction. The ball joints of the first embodiment could also be used in this second embodiment, and the trunnion joints of this second embodiment could be used in the first.

The base support 30 mounts a workpiece support 58 which holds a workpiece exemplified by the part 59.

The legs 40-45 may also be formed as hydraulic cylinders with the piston rod defining the upper end 40a et seq. and the cylinder portion forming the lower ends 40b et. seq. Because the piston rod can rotate within the cylinder, the two degrees of motion afforded at each of the joints 50 and 54 are sufficient. If the upper and lower portions of the actuators forming the legs cannot be allowed to twist, an actuator other than a hydraulic cylinder is used to accomplish the extension, and a third degree of rotational motion will be required in one or the other of the upper and lower joints 50 and 54. Instead of using hydraulic cylinders as the actuators for the legs, any means for achieving linear motion can be used such as forming the upper portion of each leg as a lead screw and mounting a rotating nut in the lower portion of the leg or vice versa. Alternatives are linear motors, recirculating ball screw drives, chain drives, and so forth.

Figure 6:
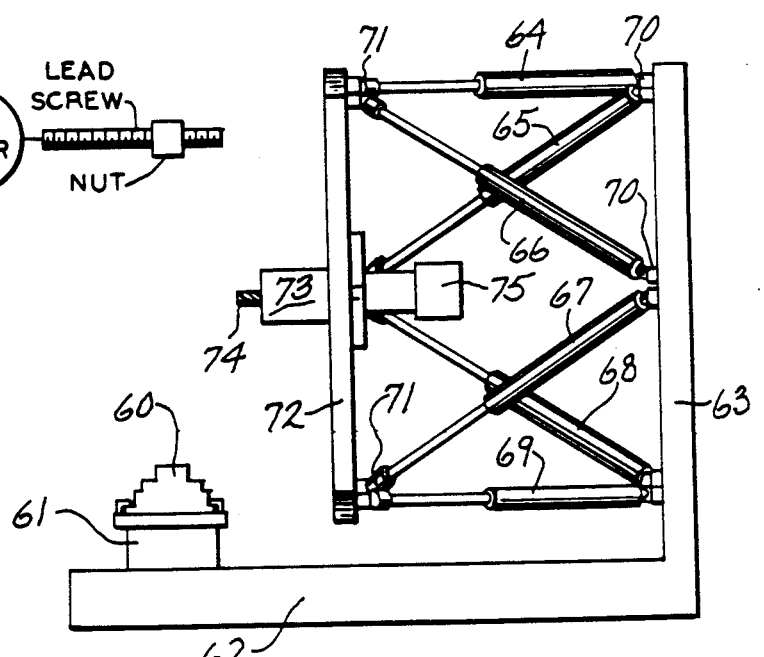
FIG. 6 is a view in elevation of a third embodiment of a machine tool in accordance with the invention.

In the third embodiment of FIG. 6, neither the tool nor the workpiece is located within the envelope defined by the leg structure. The workpiece 60 is mounted on a workpiece support 61 which in turn is mounted on a base 62 that is attached to an upright 63. The six legs 64-69 are connected at one end to the upright 63 by trunnion joints 70 in a manner similar to that of the second embodiment. The opposite ends of the legs 64-69 are connected by trunnion joints 71 to the spindle support 72. The spindle support carries a spindle 73 adapted to mount a tool 74 and the spindle 73 is driven by a spindle drive 75. The tool 74 projects away from the envelope defined by the legs 64-69. The third embodiment is otherwise the same as the first embodiment.

In the third embodiment, the workpiece support 61 may be mounted on ways supported by the base 62 so that the workpiece support 61 with the workpiece 60 may move relative to the tool 74. Even though the workpiece 60 is not mounted on the upright 63, the workpiece location relative to the upright support 63 can be fixed, or at least known, at any instant in time.

Other arrangements of spindle and workpiece can also be employed, such as mounting the workpiece above the spindle or mounting an upright 63 as in the third embodiment on ways so that it can travel along the length of a workpiece.

Figure 8:
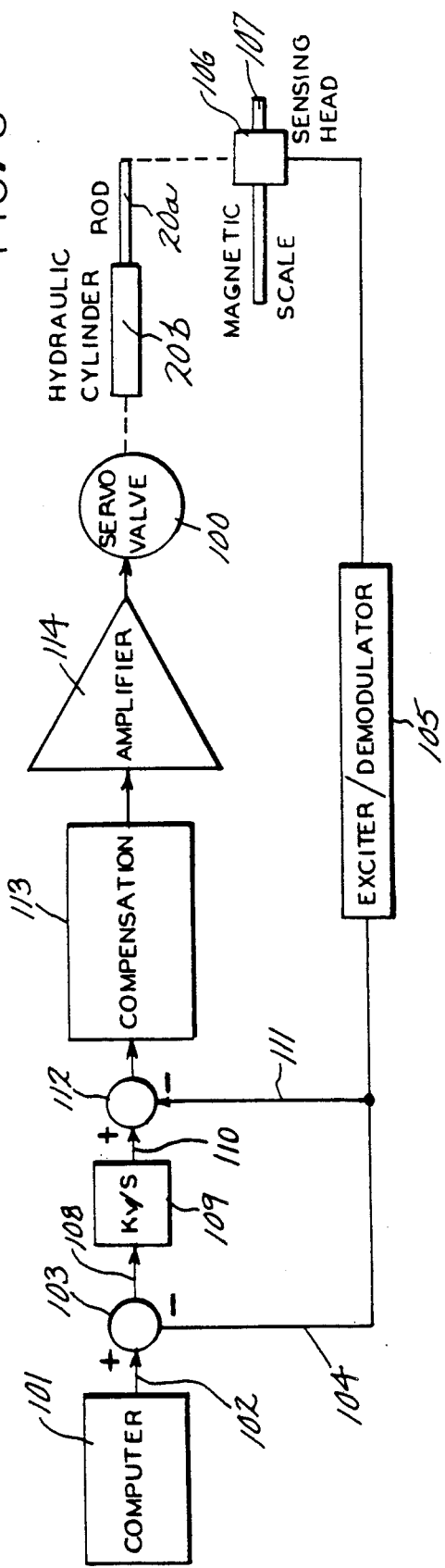
FIG. 8 is a schematic view of a control for a machine tool in accordance with the invention.
Figure 9:
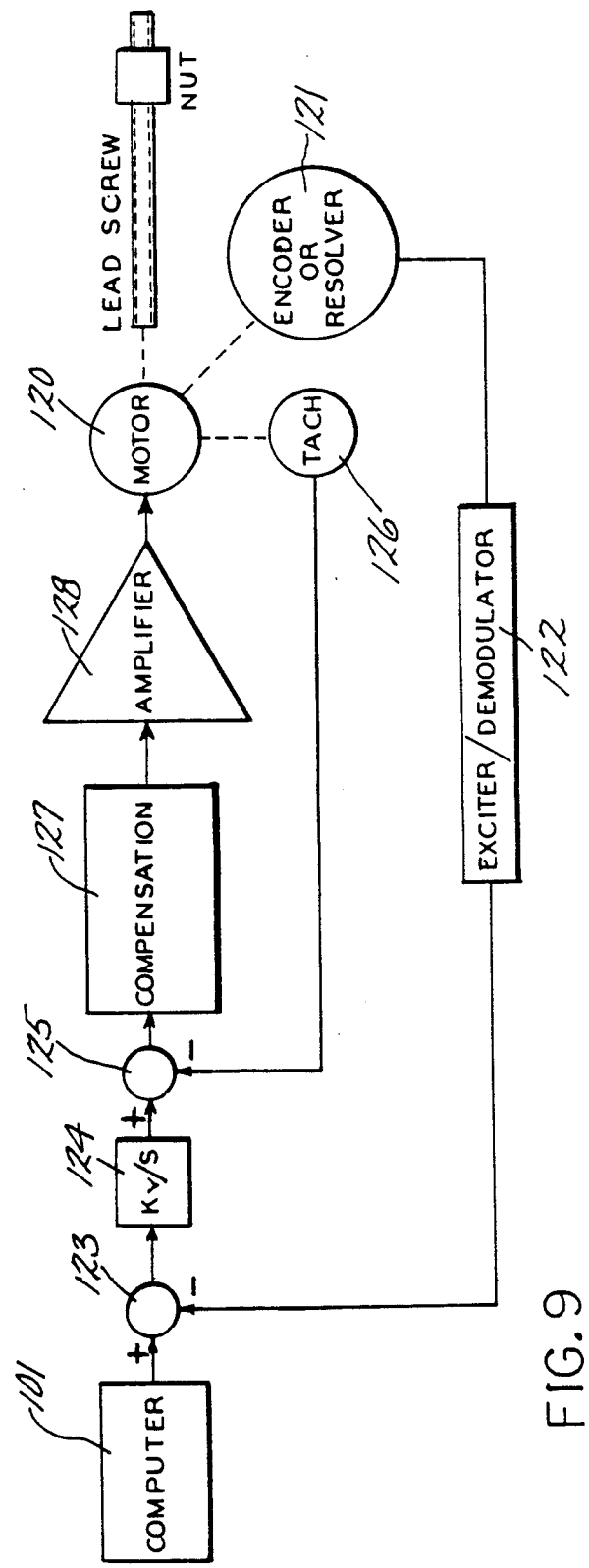
FIG. 9 is a schematic diagram of a second embodiment of a control.

The legs must be moved in a coordinated manner in order to position the supports or platforms relative to each other. The coordinated movement is preferably accomplished by a computer control which provides a position signal for each leg to achieve a desired position for the spindle platform relative to the base platform and therefore for the cutting tool relative to the workpiece. Suitable control schemes are illustrated in FIGS. 8 and 9. In FIG. 8, the leg in the form of a hydraulic cylinder such as the legs 20-25 are controlled by a servo valve 100 which controls the volume of hydraulic fluid in the cylinder and therefore the position of the piston rod within the cylinder. A computer 101 produces an output position command in the line 102. That position command is compared in a summing circuit 103 with a feedback position signal in a line 104 leading from an exciter/demodulator 105 that receives the signal from a sensing head 106 traveling along a magnetic scale 107. The sensing head 106 is coupled to the piston rod 20a et seq. so that changes in position of the piston rod will be reflected in changes in position of the sensing head 106 along the magnetic scale 107 which is at a known position, either fixed or varying, with respect to the hydraulic cylinder 20b et seq. The summing circuit 103 produces a position error signal in a line 108 which inputs to an integration network 109, the output of which is a velocity command in a line 110. The velocity command is compared with a velocity feedback signal in a line 111 leading from the exciter/demodulator 105 and the two signals are fed to a summing circuit 112 which produces an output signal representative of a velocity error. This velocity error signal is fed to a compensation network 113 where phase shift compensation takes place, and the resulting compensated signal is fed to an amplifier 114 which in turns controls the servo valve 100.

A similar control loop leading from the computer would be provided for each of the six legs 20-25 and the computer 101 would generate an output position command for the desired position of each of the six legs to achieve a particular finite position of the cutting tool relative to the workpiece.

The control arrangement of FIG. 9 is similar to that of FIG. 8 but is shown in relation to a motor 120 rotating a lead screw and nut arrangement. An encoder or resolver 121 is connected to the motor 120 to provide a position feedback signal through the exciter/demodulator 122, and that position signal is compared at a summing junction 123 with the position command from the computer 61 to produce a position error signal fed to the integration network 124 which outputs a velocity command compared at a summing junction 125 with the velocity position signal from a tachometer 126 connected to the motor 120. A compensation network 127 functions to produce an appropriate signal to an amplifier 128 connected to the motor drive. Once again, there would be a similar loop for each of the six legs of the machine.

Figure 10:
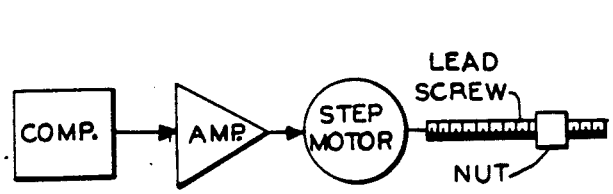
FIG. 10 is a schematic diagram of a third embodiment of a control.

The control scheme of FIG. 9 employs closed loop control. However, by using a stepping motor it is not necessary to have a closed loop control. An example of a control system using a stepping motor is shown in FIG. 10.

Position signals can be provided by sensors that are directly connected to each of the legs or to the actuators for the legs. However, a more accurate approach uses separate instrument arms. Such an arrangement is shown in FIG. 7.

Figure 7:
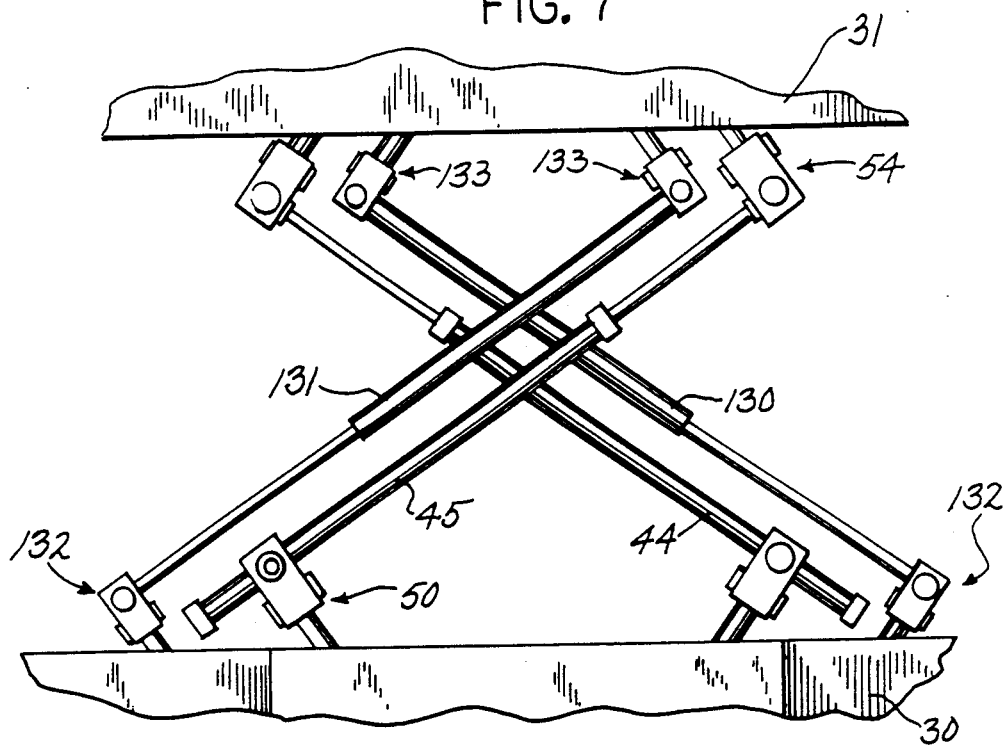
FIG. 7 is a partial view in elevation of a leg and instrument arm arrangement usable with any of the embodiments.

In FIG. 7, a six legged machine tool of the embodiment shown in FIGS. 3-6 has separate instrument arms 130 and 131 associated with respective powered legs 44 and 45, respectively. The instrument arms 130 and 131 are each linearly extensible and are connected at their lower ends to the base platform 30 by trunnion joints 132 and at their upper ends to the spindle platform 31 by trunnion joints 133. The trunnion joints 132 and 133 are the same in structure and operation as the joints 50 and 54 used to connect power legs 44 and 45 to the platforms 30 and 31.

The instrument arms 130 and 131 are used solely for the purpose of sensing the relative positions of the platforms. The instrument arms can include a sensing head traveling along a magnetic scale to provide the desired feedback signal as to length and therefore as to position. Other forms of instrument arms can also be used. The advantage in using the separate instrument arms is that the load deflections that will occur in the power legs and their joints will not be translated into errors in the position of the cutting tool. The instrument arms being smaller and lighter and carrying no weight other than their own, are not subject to the same forces and deflections to which the powered legs are subject.

Although the instrument arms 130 and 131 are shown mounted parallel with respective power legs, it is not necessary for the instrument arms to be so mounted. Instrument arms are not required to be associated with any particular power leg. It is, however, necessary to have at least six instrument arms to provide an unambiguous set of signals for the positions of the supports or platforms relative to each other.

Although the invention has been described in relation to machine tools, it is also the usable in connection with any machine that requires that an operator be brought into contact with an object. It is also useful for a wide variety of tools other than the traditional cutting tool.

We claim:

1. In a machine tool having a tool holder and a workpiece support, the combination comprising:
a tool holder platform locating the tool holder;
a workpiece support platform locating the workpiece support;
six powered and controlled extensible legs connecting the platforms together in spaced relation, each of the legs being joined to the workpiece support platform at one point along the length of the leg and being joined to the tool holder platform at a second spaced point along the length of the leg;
an actuator for each leg for individually extending and contracting the length of the leg; and
a control for the leg actuators to coordinate the operation of the actuators to vary the position of the tool holder relative to the workpiece support, said control including sensing means for determining the length of each of the six legs,
the sensing means including a plurality of extensible instrument arms connected between said platforms in a known relation to the legs so that a change in length of the legs alters the relationship between the platforms which translates into changes in length of the instrument arms.

2. A machine tool in accordance with claim 1 wherein the instrument arms each include a sensor providing a signal proportional to changes in length of said instrument arms.

3. A method of locating an operator relative to an object, comprising the steps of:
fixing the operator relative to a first support;
mounting the object relative to a second support;
connecting the supports together by powered extensible leg members connected to the supports at spaced points along their length;
joining the supports by extensible instrument arms each adapted to produce a signal representative of changes in its length; and
manipulating the leg members to vary the lengths of the leg members to thereby move the operator to a desired position of the operator relative to the object, said manipulation being responsive in part to the signals from the instrument arm.

4. In a machine tool, the combination comprising:
a first platform adapted to mount a tool;
a second platform adapted to mount a workpiece;
six linearly extensible legs each pivotally mounted adjacent one end to the first platform and each pivotally mounted adjacent the other end to the second platform, the pivot mountings in each platform circumscribing an area, and the areas in each of the two platforms being substantially the same, the pivot mountings of the legs to the platforms define the corners of like six-sided polygons in each platform wherein the corners of each polygon are substantially spaced from each other; and
means for individually varying the length of each leg to alter the position of the first platform and the tool with respect to the second platform and the workpiece.

5. A mechanism for locating an operator relative to an object, comprising the combination of:
an operator support and an object support spaced from each other;
six leg members with each leg member being joined at one point to one of the supports and being operatively connected to the other support at another point that is spaced along the leg member from the point, the six leg members being arranged in circumferentially sequential pairs with the leg members of each pair crossing each other; and means for individually manipulating at least certain of the leg members to vary the position of the points of such leg members relative to each other to thereby alter the position of the operator with respect to the object.

* * * * *